United States Patent [19]
Johnson et al.

[11] 3,904,236
[45] Sept. 9, 1975

[54] WIND DEFLECTOR FOR A TOWED TRAILER

[75] Inventors: Daniel H. Johnson, Chariton; Harry T. Johnson, Williamson, both of Iowa

[73] Assignee: Camper-Flow Mfg. Co., Chariton, Iowa

[22] Filed: Aug. 19, 1974

[21] Appl. No.: 498,669

[52] U.S. Cl. .............. 296/1 S; 98/2.11; 105/2 R; 224/42.1 E; 296/91
[51] Int. Cl.² .......................... B62D 39/00
[58] Field of Search ....... 296/1 S, 91; 105/2 A, 2 R; 98/2.14, 2.15, 2.16, 2.17, 2, 2.11; 40/129 C; 224/42.1 E; 135/5 A

[56] References Cited
UNITED STATES PATENTS

| | | | |
|---|---|---|---|
| 2,077,585 | 4/1937 | Rivers | 40/129 C |
| 2,301,834 | 11/1942 | Whaley | 40/129 C |
| 2,914,231 | 11/1959 | Hornke | 224/42.1 E |
| 3,768,854 | 10/1973 | Johnson et al | 296/1 S |

*Primary Examiner*—Robert J. Spar
*Assistant Examiner*—Gary Auton
*Attorney, Agent, or Firm*—Morton S. Adler

[57] ABSTRACT

A wind deflector is detachably mounted to the roof of a vehicle, which may be either a truck or passenger car to which a trailer is hitched, or in the case of a truck which may include a relatively high cargo compartment or camper body, whereby the wind is deflected upwardly so as to pass over the trailer, cargo compartment or camper body and reduce the wind resistance which such units normally present. For use on truck cabs, this deflector is designed to accommodate the presence of cab roof mounted accessories such as air conditioners and horns.

8 Claims, 10 Drawing Figures

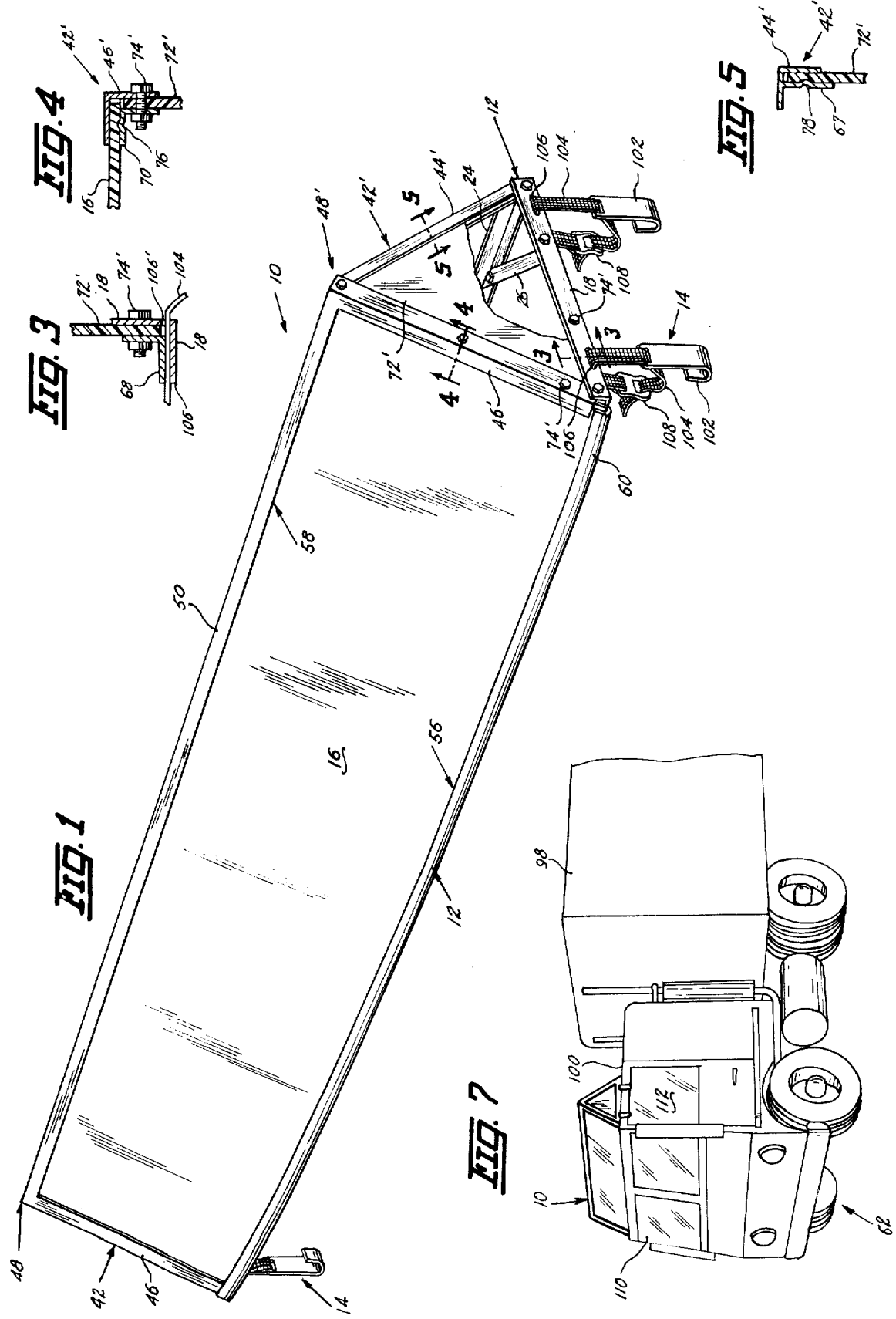

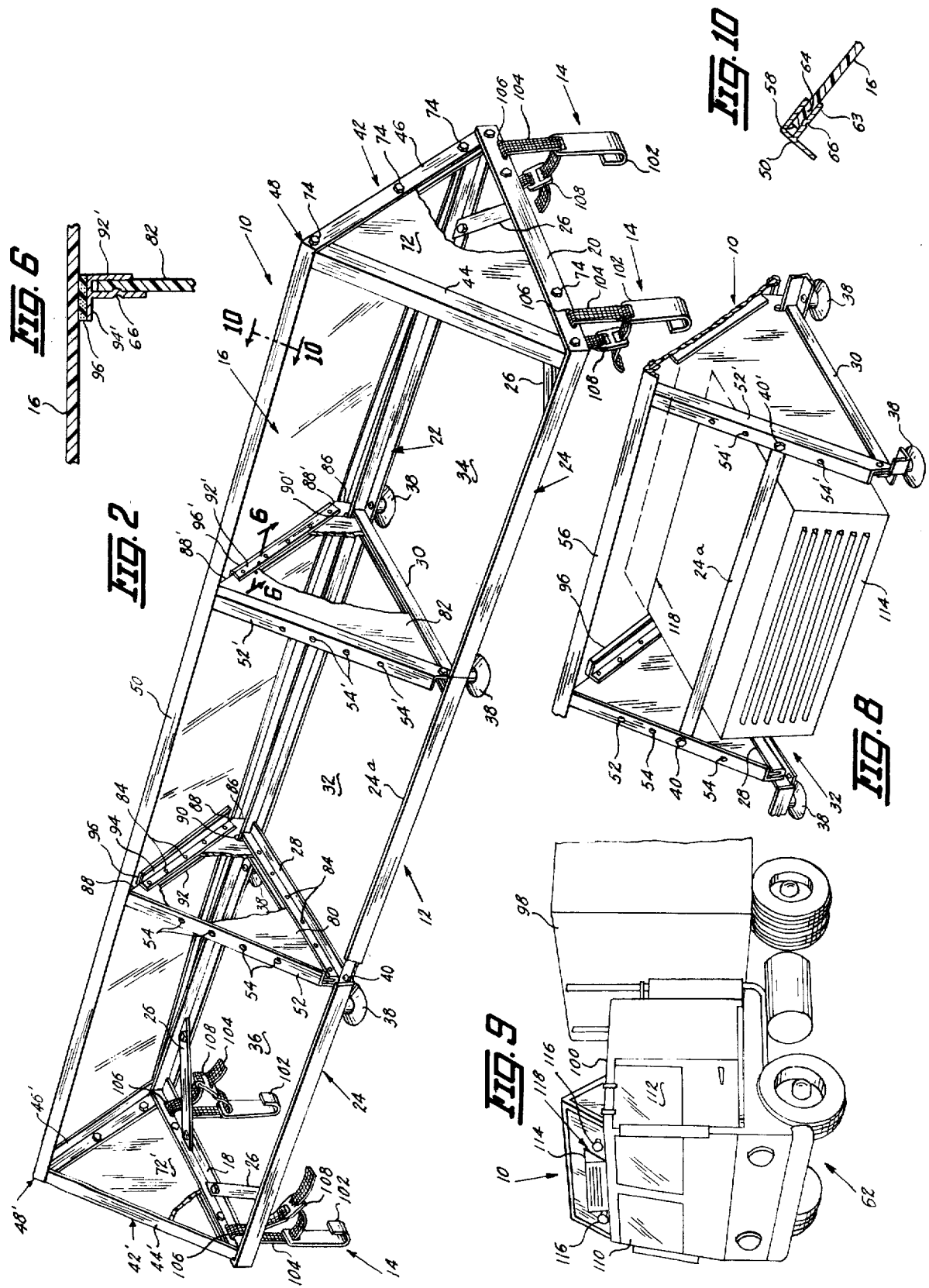

WIND DEFLECTOR FOR A TOWED TRAILER

BACKGROUND OF THE INVENTION

This invention relates to a wind deflector designed particularly for use on vehicles having a trailer hitched thereto or including a relatively high cargo compartment or camper body and is an improvement of the deflector disclosed in our U.S. Pat. No. 3,768,854.

It is believed to be generally recognized that in the towing of large semi-trailers, the movement of trucks with large self-contained cargo compartments and in the use of the so-called travel trailers by the motoring public on modern highways at relatively high speeds, such trailers, cargo and camper bodies offer substantial wind resistance that increases the problems of control for the vehicle operator, reduces the overall efficiency of the powered vehicle and substantially increases the per mile fuel consumption and while these are all important considerations, particular awareness and concern of the fuel consumption rate is rapidly increasing in view of the substantial rise in the price of fuel and the possibility of a reduced fuel supply. Accordingly, one of the important objects of the present invention is to provide a wind deflector device which can be suitably mounted on the roof of the towing vehicle or on the roof of a truck cab carrying a mounted cargo compartment or a camper body so as to deflect the wind and air upwardly, rearwardly, over and around the trailer, cargo compartment or camper body.

A further object herein is to provide a wind deflector of the above class which can be easily mounted to and removed from the vehicle roof without the use of any tools and which, when mounted, has a fixed position of inclination to provide for suitable air deflection for its intended purpose.

Another important object herein is to provide a suitable wind deflector as characterized which can be readily adapted to accommodate the presence of an air conditioner unit and other accessories such as horns that, particularly in the case of trucks, may be mounted on the roof of the vehicle.

The objects of this invention together with details of the operation outlined and the advantages of the same will be more fully described and developed in relation to the more detailed description of the accompanying drawings.

BRIEF DESCRIPTION OF THE DRAWINGS

FIG. 1 is a perspective front view illustrating our new wind deflector,

FIG. 2 is a perspective rear view thereof,

FIG. 3 is a cross sectional view taken on the line 3—3 of FIG. 1,

FIG. 4 is a cross sectional view taken on the line 4—4 of FIG. 1,

FIG. 5 is a cross sectional view taken on the line 5—5 of FIG. 1,

FIG. 6 is a cross sectional view taken from the line 6—6 of FIG. 2,

FIG. 7 is a reduced perspective view of this deflector shown in place on the roof of a truck cab, FIG. 8 is a perspective view of the rear center portion of this deflector shown arranged to accommodate a roof mounted air conditioner unit, FIG. 9 is a reduced perspective view similar to FIG. 7 but showing the front of the air conditioner unit seen in FIG. 8 and also showing the deflector accommodating a pair of roof mounted horns, and FIG. 10 is a cross sectional view taken on the line 10—10 of FIG. 2.

DESCRIPTION OF THE PREFERRED EMBODIMENTS

Referring to the drawings, our new wind deflector is indicated generally by the numeral 10 as best seen in FIGS. 1 and 2 and comprises generally a support frame 12, a strap assembly 14 attached to frame 12 and a wind deflector shield 16 attached to frame 12 as will appear.

The frame 12 is preferably made of extruded angle aluminum although it will be appreciated that any other suitable material may be used. Such frame is generally rectangular and, as best seen in FIG. 2, includes the relatively widely spaced parallel side rails 18 and 20 suitably secured at respective corresponding ends to a front rail 22 and a rear rail 24. Diagonal corner braces 26 are secured to frame 12 for obvious reasons and a pair of spaced parallel braces 28 and 30 which are also parallel to side rails 18 and 20 are secured to and between the front and rear rails 22 and 24 whereby there is formed the central area 32 of frame 12 bordered by the respective end areas 34 and 36 of substantially equal size. To the underside of frame 12 at approximately the four corners of the center area 32 there is removably attached a suction cup 38 and that portion of the rear rail 24, designated 24a, forming the rear side of the center area 32, is in fact separate and removable from the rear rail portions 24 for areas 34 and 36 and, as seen in FIG. 2, when in alignment with rail 24, is secured to the rear end of braces 28 and 30 by any suitable means such as a bolt and nut arrangement 40.

As seen in FIG. 2, side rail 20 serves as the base of a triangular or A-frame upstanding support 42 defined by the rear angle brace 44 and the front brace 46 secured at their lower ends respectively to the rear and front ends of rail 20 from which they converge to be joined together at the elevated apex point 48 and side rail 18 is provided with a similar arrangement to form a support for which like parts are given like numbers primed. A rigid brace member 50 extends between the supports 42–42' and is connected to the respective apex points 48–48' on such supports. Intermediate supports 42–42' (FIG. 2), the respective angle brace members 52–52', generally parallel to the rear angle braces 44–44', are attached at their lower ends to the respective braces 28 and 30 adjacent the rear rail 24 and at their upper ends to the top brace 50 and are provided with the longitudinally spaced corresponding holes 54–54' for adjustment of the rear rail 24a as will later be explained in more detail.

The shield 16 (FIG. 1) is of an elongated rectangular shape of a suitable bendable and preferably transparent material to give it a windshield-like appearance although it will be understood that it may be made of any other appropriate material. For purposes of description, shield 16 has the leading edge 56 and the trailing edge 58. Such shield 16 is designed to fit within the confines of the supporting structure therefore defined by the braces 46–46' of the supports 42–42' and the top brace 50 whereby the leading edge 56, encased in a protective stripping 60, overhangs the forward rail 22 of frame 12 so as to be capable of engaging the roof of a vehicle 62 as will be referred to in more detail.

In the mounting of shield 16 as seen in FIG. 1, reference is made to FIG. 10 showing the construction of the angle brace 50 to which we have integrally formed a spaced parallel shoulder or side 63 relative to one of the sides of brace 50 to provide a track 64 into which the trailing edge 58 of shield 16 can be frictionally slip-fitted and for which brace structure we have given the name of an F frame. Such frictional attachment is preferably enhanced by impressing a punched point at spaced intervals along the inner side 63 as indicated by the depression point 66 in FIG. 10. In attaching the shield 16 to the braces 46–46' of the side supports 42–42', it is first pointed out that on supports 42–42', rear braces 44–44' define an F frame arrangement by the use of an inner rail 67 as seen in FIG. 5 which is the same as for brace 50 seen in FIG. 10. Rails 18 and 20 and front braces 46–46' are a modified F frame arrangement obtained by using the respective second inside nested angle members 68 for rails 18 and 20 (FIG. 3) and 70 for braces 46–46' (FIG. 4). This arrangement for side supports 42–42' is provided so that a gusset member 72, preferably of a relatively strong transparent plastic material is secured to each of said supports by being frictionally slip-fitted to the rear braces 44–44' and secured to the rails 18 and 20 and the forward braces 46–46' by use of the second angles 68 and 70 with nut and bolt means 74–74' seen in FIGS. 3 and 4. In this manner, the side supports 42–42' are adequately strengthened to withstand any air forces encountered. The arrangement of the inner rail 70 member relative to braces 46–46' as seen in FIG. 4 provides for what we have called the F frame structure for a frictional slip-fit reception of the respective ends of shield 16 with the shield ends resting on the edge of the gusset 72 (FIG. 4) that is secured to 46–46' by the bolts 74–74' and, as shown, rail 70 is punched as at 76 and rail 67 on braces 44–44' is punched 78 similarly to that described for 66 in FIG. 10 and for a like purpose.

Referring now more particularly to FIG. 2, it is pointed out that the centrally located braces 28 and 30 on frame 12 and the brace members 52–52' are of the F frame construction, previously described, to receive the respective gussets 80 and 82 in the same manner as indicated for the mounting of shield 16 and with punched or pressed points 84 preferably employed, the same as at points 66, 76 and 78. It is pointed out that the bottom end of gussets 80 and 82 attached respectively to braces 28 and 30 are somewhat longer than the distance between the rear rail 24 and the front rail 22 of frame 12 so as to project forwardly of rail 22 to define their respective leading edges 88–88' and, accordingly, such bottom edges are notched as at 90–90' at the point of intersection with the upstanding side of angle rail 22 and thus arranged, the leading edges 88–88' are inclined downwardly from brace 50 to their projected ends forwardly of rail 22 similarly to the inclination of braces 46–46'. A respective length of F frame material, 92–92', less than the length of the leading edges 88–88', is attached to each such leading edge intermediate the extremities thereof as seen in FIGS. 2 and 6, and to that side of members 92–92' overlying edges 88–88', designated by the numerals 94–94', a strip of foam, rubber or other like resilient padding material 96–96' is suitably bonded. Thus, by the arrangement of gussets 80 and 82 with strips 92–92' on the leading edges 88–88', it will be seen that shield 16 extends betwen side supports 42–42' in a bowed path by resting in its central portion on the foam pads 96–96' and the leading edge 56 can thus extend to a point lower than the bottom plane of rail 22. Shield 16 is thus suitably braced against wind forces intermediate its ends by the back-up supports 92–92' and presents not only a surface inclined upwardly and rearwardly but also having a lateral radius for deflection of wind forces.

Deflector 10 is designed to be detachably arranged relative to the roof of a vehicle 62 here shown for illustration in FIGS. 7 and 9 in the form of a truck having a cargo body or attached trailer 98 extending to a point higher than the roof of the cab 100 and it will be understood that shield 16 may also be used on passenger cars pulling trailers higher than the car or with pickup trucks on which there may be mounted the well known camper body. For mounting deflector 10, we have utilized the strap assembly 14 on side supports 42–42' for which no invention is claimed per se since it is a common form of attaching means for car top carriers and other like devices. The strap assembly 14 as seen in FIGS. 1 and 2 includes a hook member 102 slidably arranged on a length of strap 104 which extends through a slot 106 in the respective rails 18 and 20 as shown in FIG. 3. One end of strap 104 is provided with a suitable buckle 108 whereby the strap ends can be joined and the strap tightened in an obvious manner. Preferably, there are two strap assemblies 14 as described on each side support 42–42' as shown in FIGS. 1 and 2.

Deflector 10 as described is mounted to the roof 100 of vehicle 62 as seen in FIG. 7 preferably close to the vehicle windshield 110 and is designed to extend approximately from side to side of the vehicle roof. Hooks 102 are engaged above the front window 112 in a well known manner and with the straps 104 buckled and drawn tight, cups 38 will be fully set and the leading edge 56 of shield 16 will be in abutting engagement with the vehicle roof whereby deflector 10 most efficiently serves in deflecting wind currents over and around any towed trailer or high rising cargo or camper body. The effect of this not only eliminates the ordinary drag on the vehicle by the wind resistance of the trailer or cargo or camper body, but increases the ease and facility in driving the vehicle and, on the basis of actual field tests, has resulted in highly improved economy of operation.

With reference now to FIGS. 8 and 9, there is shown means, particularly in regard to truck vehicles, for accommodating the presence of an air conditioner unit 114, and also horn assemblies 116, that are commonly mounted on the roof 100 of the truck cab. Such units 114 and 116, when used, are frequently located as shown in FIG. 9 where the air conditioner 114 is centrally positioned between the side edges of the roof 100. Accordingly, the center section 32 of deflector 10 registers with the customary position of unit 114 and shield 16 is made from a suitable material capable of having a portion cut out by any suitable means to form an opening designated by the number 118 to complement the exterior contour of unit 114 and thus permit deflector 10 to be mounted relative thereto as shown whereby the front of unit 114 can project forwardly of shield 16 for proper air reception. In this arrangement, rear rail 24a is removed from its position shown in FIG. 2 and is elevated for attachment to braces 52–52' as seen in FIG. 8. The plurality of attaching points represented by holes 54–54' permit the proper placement of rail 24a according to varying heights of units 114 that may be encountered. Thus, the full rearward extension of unit 114 is accommodated and adequate bracing of brackets 52–52' is maintained. For the horns 116, if present, a contoured cut-out of shield 16 can also be made. By this arrangement, it will be appreciated that on truck cabs where space is generally limited, the advantages of this deflector 10 can be obtained even when roof top accessories such as 114 and 116 are present. Accordingly, from all of the foregoing it is thought that a full and complete understanding of the construction and operation of this device will be had and the advantages of the same will be appreciated.

We claim:

1. A wind deflector for use on a motor vehicle of the type with which there is associated a separate wind resistance surface in the form of a towed trailer, a self-contained cargo compartment or a camper body attachment, said deflector comprising:
   a first pair of spaced parallel rails having front and rear ends secured at corresponding ends to a second pair of spaced parallel rails of a greater length than said first pair of rails wherein said first pair of rails define the side rails and said second pair of rails define respectively the front and rear rails of a rectangular frame,
   respective like upstanding supports carried by each side rail,
   a rigid top brace connected to said supports at their upper extremity,
   a wind deflector shield extending to and between said supports and secured thereto and to said top brace,
   said wind deflector shield including a central bowed portion disposed forwardly from said front rail,
   a reinforcement means on said frame centrally thereof intermediate said supports and secured to said front and rear rails and to said top brace,
   said reinforcements means including an edge portion extending forwardly of said front rail and in abutting engagement with the bowed portion of said wind deflector shield, and
   means to removably secure said frame to the roof of a vehicle so that said front and rear rails extend transversely of the direction of forward travel.

2. A wind deflector as defined in claim 1 including:
   said wind deflector shield having a leading edge and a trailing edge,
   said trailing edge being secured to said top brace so that said wind deflector shield is inclined downwardly and forwardly to said leading edge, and
   said leading edge being disposed forwardly of said front rail in an overlying relationship thereto so as to be abutting contact with the roof of a vehicle when said frame is mounted on the roof thereof.

3. A wind deflector as defined in claim 2 including a protective covering strip on the leading edge of said wind deflector shield.

4. A wind deflector as defined in claim 1 including: said reinforcement means comprising:
   a first pair of spaced parallel braces having front and rear ends and said braces being centrally positioned intermediate said supports and secured to said front and rear rails to define a central area of said frame,
   a second pair of spaced braces secured respectively at one end to the respective rear ends of said first pair of braces and secured at their opposite ends to said top brace,
   respective rigid gusset members secured to said respective first and second pair of braces and said top brace and including a leading edge extending from said top brace downwardly and forwardly to terminate at a projected point spaced outwardly and forwardly from said front rail, and
   a respective resilient pad member secured to the leading edge of each gusset member intermediate the extremities of the leading edge thereon and in abutting engagement with the bowed portion of said wind deflector shield.

5. A wind deflector as defined in claim 4 including:
   said rear rail having an intermediate separate section extending between and removably secured to the rear ends of said first pair of braces and defining the rear side of said central area,
   means for selectively removably securing said separate section to and between said second pair of braces at a plane intermediate said rear rail and said top brace, and
   said wind deflector shield being provided with a selected contoured opening in registration with said central area whereby said wind deflector when mounted on a vehicle can accommodate in said central area an accessory unit such as an air conditioner which may also be mounted on the vehicle roof.

6. A wind deflector for use on a motor vehicle of the type with which there is associated a separate wind resistance surface in the form of a towed trailer, a self-contained cargo compartment or a camper body attachment, said deflector comprising:
   a first pair of spaced parallel rails having front and rear ends secured at corresponding ends to a second pair of spaced parallel rails of a greater length than said first pair of rails wherein said first pair of rails define the side rails and said second pair of rails define respectively the front and rear rails of a rectangular frame,
   respective like upstanding supports carried by each side rail,
   a rigid top brace connected to said supports at their upper extremity,
   a wind deflector shield extending to and between said supports and secured thereto and to said top brace,
   a first pair of spaced parallel braces having front and rear ends and said braces being centrally positioned intermediate said supports and secured to said front and rear rails to define a central area of said frame,
   a second pair of spaced braces secured respectively at one end to the respective rear ends of said first pair of braces and secured at their opposite ends to said top brace,
   said rear rail having an intermediate separate section extending between and removably secured to the rear ends of said first pair of braces and defining the rear side of said central area,
   means for selectively removably securing said separate section to and between said second pair of braces at a plane intermediate said rear rail and said top brace,
   means to removably secure said frame to the roof of a vehicle so that said front and rear rails extend transversely of the direction of forward travel, and said wind deflector shield being provided with a selected contoured opening in registration with said central area whereby said wind deflector when mounted on a vehicle can accommodate in said central area an accessory unit such as an air conditioner which may also be mounted on the vehicle roof.

7. A wind deflector as defined in claim 6 including:
said wind deflector shield having a leading edge and a trailing edge,
said trailing edge being secured to said top brace so that said wind deflector shield is inclined downwardly and forwardly to said leading edge, and
said leading edge being disposed forwardly of said front rail in an overlying relationship thereto so as to be in abutting contact with the roof of a vehicle when said frame is mounted on the roof thereof.

8. A wind deflector as defined in claim 7 including a protective covering strip on the leading edge of said wind deflector shield.

* * * * *